(12) United States Patent
Wennerström

(10) Patent No.: US 6,364,935 B1
(45) Date of Patent: Apr. 2, 2002

(54) METHOD AND DEVICE FOR CLEANING OF A GASEOUS FLUID

(75) Inventor: Johan Wennerström, Sollentuna (SE)

(73) Assignee: Bleuair AB, Stockholm (SE)

( * ) Notice: Subject to any disclaimer, the term of this patent is extended or adjusted under 35 U.S.C. 154(b) by 0 days.

(21) Appl. No.: 09/403,743

(22) PCT Filed: May 8, 1998

(86) PCT No.: PCT/SE98/00818

§ 371 Date: Oct. 28, 1999

§ 102(e) Date: Oct. 28, 1999

(87) PCT Pub. No.: WO98/50162

PCT Pub. Date: Nov. 12, 1998

(30) Foreign Application Priority Data

May 6, 1997 (SE) .............................................. 9701695

(51) Int. Cl.[7] .............................................. B03C 3/155
(52) U.S. Cl. ................... 95/57; 55/528; 95/70; 96/66; 96/67; 96/97
(58) Field of Search ............................... 96/17, 54, 59, 96/66, 67, 97; 55/528; 95/57, 70

(56) References Cited

U.S. PATENT DOCUMENTS

| | | | |
|---|---|---|---|
| 3,999,964 A | * | 12/1976 | Carr ............................. 96/59 |
| 4,940,470 A | | 7/1990 | Jaisinghani et al. ...... 55/521 X |
| 5,240,479 A | * | 8/1993 | Bachinski ...................... 96/17 |
| 5,330,559 A | * | 7/1994 | Cheney et al. .............. 96/59 X |
| 5,336,299 A | * | 8/1994 | Savell ........................ 96/17 X |
| 5,368,635 A | * | 11/1994 | Yamamoto ...................... 96/17 |
| 5,403,383 A | * | 4/1995 | Jaisinghani ................ 96/67 X |
| 5,411,576 A | * | 5/1995 | Jones et al. ................. 96/66 X |
| 5,518,531 A | * | 5/1996 | Joannu ....................... 96/97 X |

FOREIGN PATENT DOCUMENTS

EP 0646416 A1 5/1995

* cited by examiner

Primary Examiner—Richard L. Chiesa
(74) Attorney, Agent, or Firm—Chapman and Cutler

(57) ABSTRACT

The present invention relates to a method for cleaning of a gaseous fluid from particles being present in the fluid, the gaseous fluid being ionized, i.e. the particles are subjected to a charging, and that the ionized gaseous fluid is brought to pass through a precipitator unit (2) including a filter medium. The invention also relates to a device for cleaning of a gaseous fluid. Filters for cleaning of air often require expensive filter medium and complicated arrangements as regards ionization of the air and charging of the filter medium. The present invention is characterized by an extremely simple method where the air is ionized and then the ionized air is brought to pass through a filter medium of polypropylene.

11 Claims, 3 Drawing Sheets

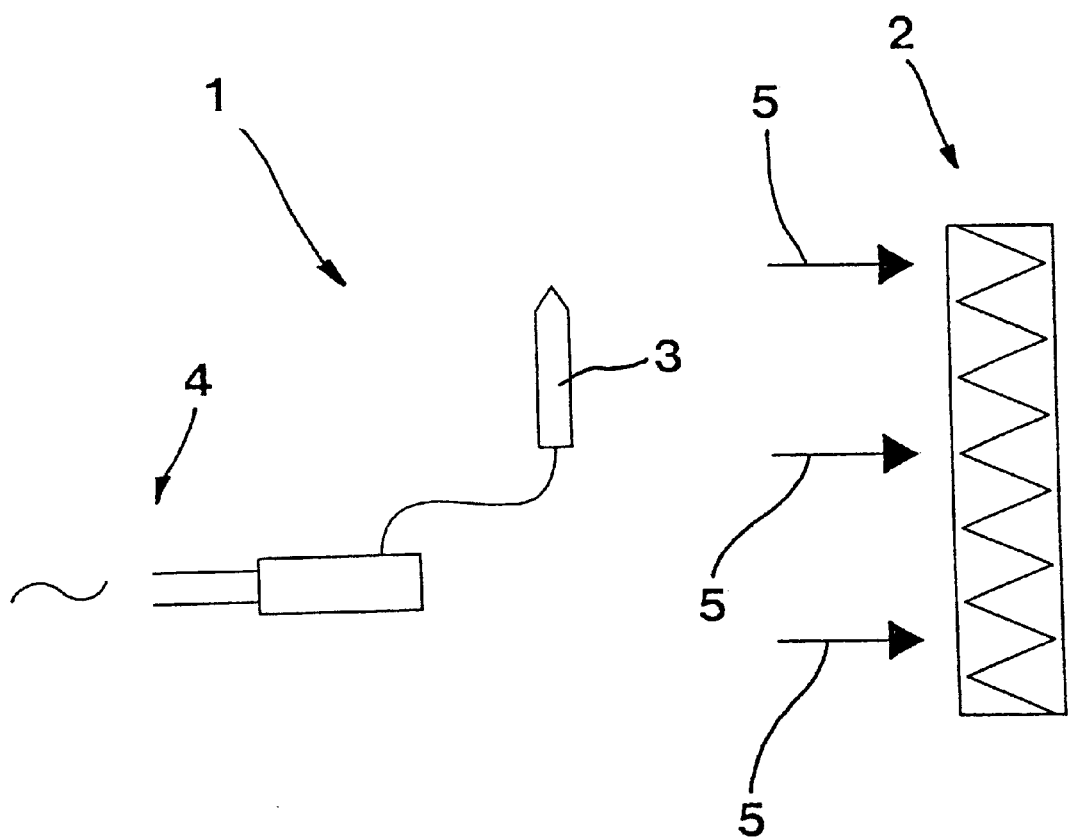

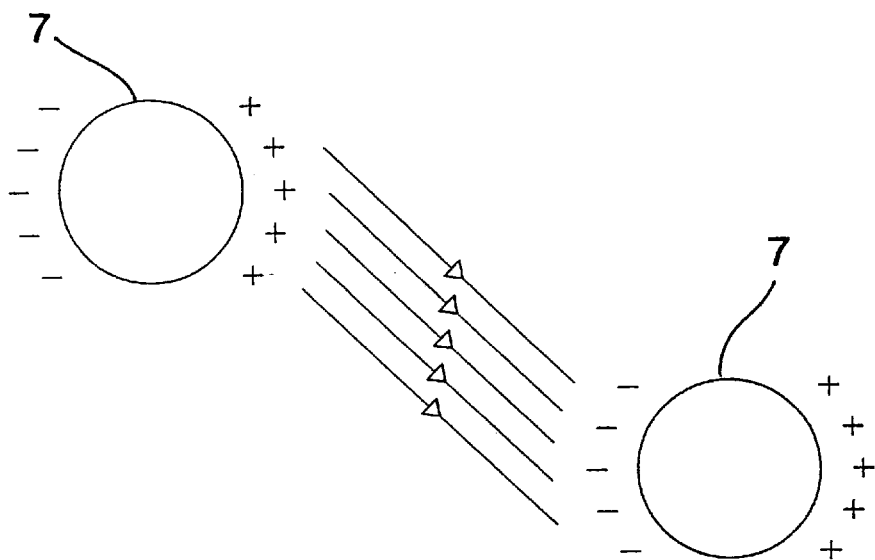
Fig 3a
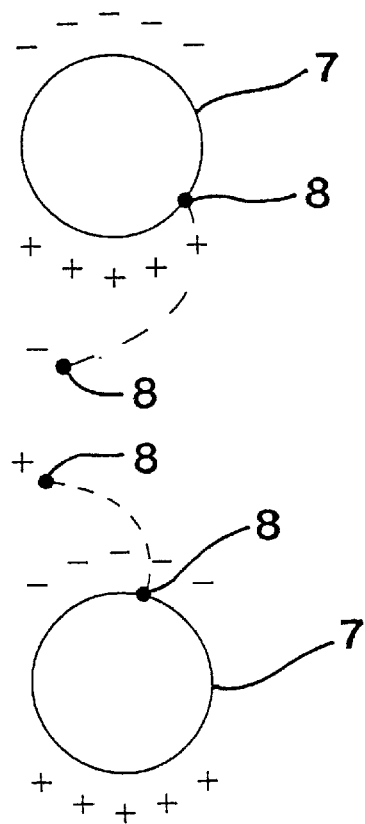
Fig 3b

METHOD AND DEVICE FOR CLEANING OF A GASEOUS FLUID

This application is a National Stage of International Application No. PCT/SE98/00818 filed May 5, 1998.

TECHNICAL FIELD OF THE INVENTION

The present invention refers to a method for cleaning of a gaseous fluid from particles being present in said fluid, said gaseous fluid being ionised, i.e. the particles are subjected to a charging, and that said ionised gaseous fluid is brought to pass through a precipitator unit including a filter medium. The invention also refers to a device for cleaning of a gaseous fluid.

PRIOR ART

From SE-A-9604817-8 a device is previously known in connection with an active electret filter of the type defined above. Thereby, an electric field is directed towards the precipitator unit that consists of medium being electrically non-conductive and whose molecules are easily polarised or oriented by an electric field directed towards the precipitator unit. By this arrangement an electric field is created inside the fibre material that the precipitator unit preferably consists of. The particles that pass through the filter medium, said particles being charged by the ionization unit, are attracted and repelled respectively by the filter fibres depending on the charging and polarity of the fibres and the particles respectively.

OBJECTS AND FEATURES OF THE INVENTION

The object of the present invention is to define a method and a device of the type defined above, the present invention being essentially more simplified compared to the device that has been described under the headline "Prior Art". The objects of the invention is realised by a method and a device that have been given the features defined in the appending claims.

BRIEF DESCRIPTION OF THE ENCLOSED DRAWINGS

In the drawings:

FIG. 1 is a schematic view of a device according to the invention;

FIG. 3a is a schematic view showing how an electric field is created between the polarised fibres that are included in the filter medium; and FIG. 3b shows schematically how the charged particles that pass the filter are attracted and repelled respectively by the fibres included in the filter medium.

Figure 2A:
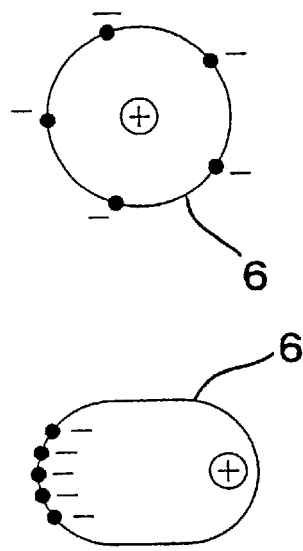
FIG. 2a is a schematic view of a molecule before and after polarisation, said molecule being included in the fibre material of the precipitator unit.

DETAILED DESCRIPTION OF THE PRINCIPLES OF THE INVENTION AND A SCHEMATIC EMBODIMENT OF THE INVENTION

The device shown in FIG. 1 comprises a ionization unit 1 that in the shown embodiment includes a corona tip 3. However, within the scope of the invention also other types of ion sources are feasible, e.g. a coal fibre brush or a corona wire. The device also includes a precipitator unit 2 that below will be described more in detail.

The ionization unit 1 comprises in a known way a high voltage source 4 that is connected to the corona tip 3. The ionization unit 1 does not need to be located adjacent to the precipitator unit 2 but said ionization unit 1 may in principle be located anywhere in the space that contains gaseous fluid, said fluid being cleaned by means of the method and the device according to the present invention.

The precipitator unit 2 consists of a filter of an electrically non-conductive medium, preferably a fibre filter of polypropylene. It is also advantageous if the filter medium is a so called fine filter medium that in the present application is defined as a filter medium having a fibre diameter down to 1 $\mu$m and a spacing between the fibres of the magnitude 10 $\mu$m. The air velocity through such a fine filter medium is usually 2–10 cm/s.

It is preferred that the fibres, included in the filter medium, are not pre-charged but charged by the particles charged in the ionization unit, i.e. said particles emit their charging to the fibres 7 (see FIGS. 3a and 3b) in the filter medium when said particles adhere to said filter medium. This can also be expressed in such a way that the present invention preferably does not constitute an electret filter. It is also advantageous if the fibres 7 in other respects are untreated.

The device according to the invention functions in the following way. In the space where the ionization unit 1 is located the gaseous fluid, normally air, contains particles that are charged by the ions that the ionization unit 1 emits. In this connection it should be repeated that the ionization unit 1 may in principle be located anywhere in the space that contains the gaseous fluid/air that is to be cleaned.

Figure 2B:
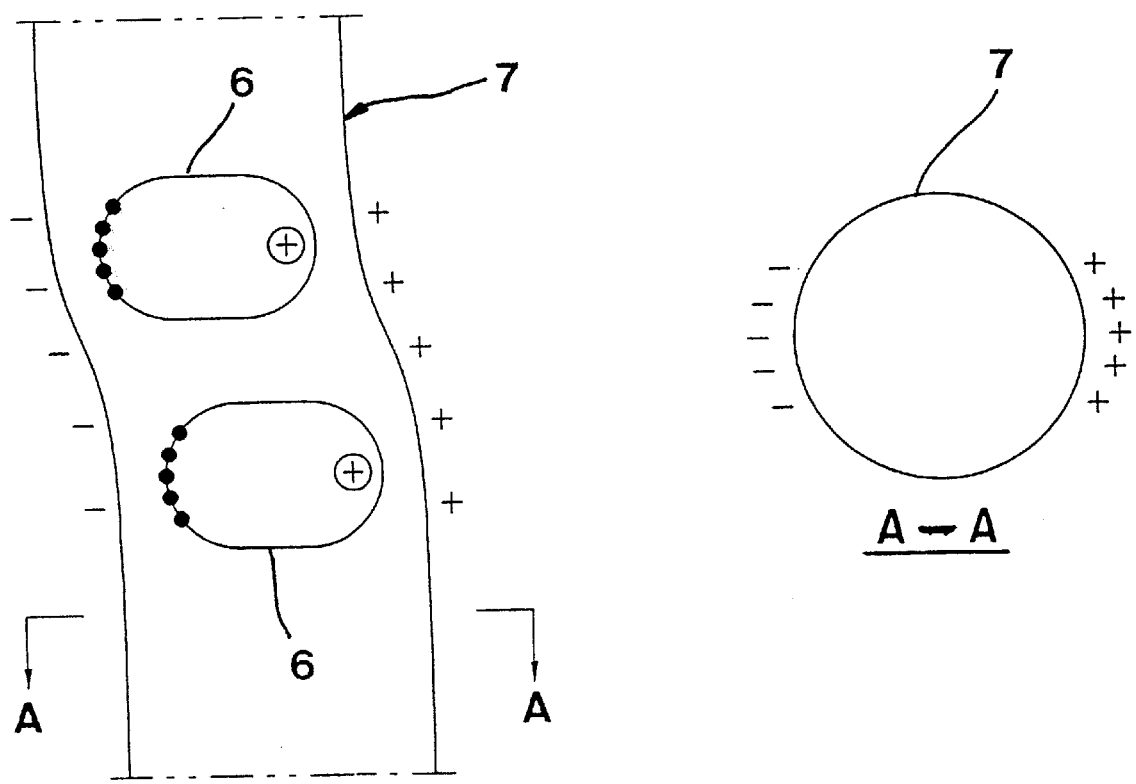
FIG. 2b is a schematic view showing how the molecules of the filter medium are oriented.

The particles charged by the ionization unit 1 are in a suitable way, e.g. by means of a fan (not shown), brought to pass through the precipitator unit 2, this being indicated by the arrows 5. When these particles hit the fibres of the filter medium a polarisation of the molecules of said fibres takes place. If it is assumed that a particle having a positive charging, i.e. positive corona is used, hits the upper molecule 6 in FIG. 2a said particle will be polarised in the way shown at the bottom of FIG. 2a. In a corresponding way a fibre 7 that thus contains a lot of such polarised molecules 6, see FIG. 2b, will have a negative side and a positive side. Charged particles that pass through the filter, after chargings have been induced upon the surfaces of the fibres 7, will adhere to said fibres 7, thus a particle having positive charging will adhere at the left side of the fibre 7 shown in FIG. 2b.

In FIG. 3a it is schematically shown how a fibre 7 upon whose surface chargings have been induced by the polarised molecules may induce chargings upon the surface of an adjacent fibre 7.

In FIG. 3b is schematically shown how charged particles 8 that pass through the precipitator unit 2 are attracted and repelled respectively by the fibres 7 depending on the charging and polarity of the fibres 7 and particles 8 respectively.

The invention is in no way restricted to a positive corona but negative corona is preferred from certain aspects, a negative corona for instance generates less ozone than a positive corona.

What is claimed is:

1. A device for cleaning of a gaseous fluid from particles present in said fluid, comprising:

a permanently positive or permanently negative high voltage source;

a filter spaced apart from said source, said filter comprising a fine filter medium composed of fibers having a fiber diameter of approximately 1 micron or greater, and an average spacing between said fibers of approximately ten times said fiber diameter, said fibers being easily polarized when subjected to an electric charge;

means for passing a flow of said fluid past said high voltage source and through said filter;

said filter further characterized by an absence of external charging means other than said particles passing through said filter.

2. A device as defined in claim 1, wherein said means for passing said fluid flow past said high voltage source provides a velocity of said fluid between 2 and 10 cms. per second.

3. A device as defined in claim 1, wherein said filter fibers have a diameter of approximately 1 micron.

4. A device as defined in claim 1, wherein said filter fibers comprise untreated polypropylene.

5. A device as defined in claim 1, wherein said high voltage source comprises a corona discharge means.

6. A device as defined in claim 1, wherein said high voltage source comprises a carbon fiber brush.

7. A method for cleaning of a gaseous fluid from particles being present in said fluid, comprising the steps of:

providing a high voltage source and a fine filter medium displaced from said source, said fine filter medium composed of electrically non-conductive fibers having a diameter of approximately 1 micron or greater, and an average spacing between said fibers of approximately ten times said fiber diameter;

passing said fluid past said high voltage source, thereby permanently charging said particles either positively or negatively without alternating between said positive or negative charge;

passing said charged particles through said filter medium, thereby polarizing said fibers into a positive side and a negative side thereof without any change in polarity of said fibers during said cleaning of said fluid; and adhering said charged particles to an oppositely-charged side of said fibers, said fibers being charged solely by said particles.

8. A method as defined in claim 7, wherein said fibers comprise untreated polypropylene.

9. A method as defined in claim 7, wherein said fibers have a diameter of approximately 1 micron.

10. A method as defined in claim 7, wherein the velocity of said fluid is between approximately 2 and 10 cms per second.

11. A method as defined in claim 7, wherein said high voltage discharge means is selected from one of a corona source or a carbon fiber brush.

* * * * *